(12) United States Patent
Liu

(10) Patent No.: US 9,906,252 B2
(45) Date of Patent: Feb. 27, 2018

(54) ELECTRONIC DEVICE HAVING FM ANTENNA AND METHOD FOR SWITCHING FM ANTENNA

(71) Applicant: Chiun Mai Communication Systems, Inc., New Taipei (TW)

(72) Inventor: Cheng-Ping Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/620,834

(22) Filed: Jun. 13, 2017

(65) Prior Publication Data
US 2017/0366211 A1 Dec. 21, 2017

(30) Foreign Application Priority Data

Jun. 15, 2016 (CN) .......................... 2016 1 0435432

(51) Int. Cl.
| | |
|---|---|
| H04B 1/00 | (2006.01) |
| H04B 1/16 | (2006.01) |
| H04M 1/02 | (2006.01) |
| H04H 40/45 | (2008.01) |
| H04W 88/06 | (2009.01) |
| H01R 24/58 | (2011.01) |
| H01R 103/00 | (2006.01) |

(52) U.S. Cl.
CPC ........... *H04B 1/1646* (2013.01); *H01R 24/58* (2013.01); *H04H 40/45* (2013.01); *H04M 1/0274* (2013.01); *H04W 88/06* (2013.01); *H01R 2103/00* (2013.01)

(58) Field of Classification Search
CPC . H04N 5/44; H04N 5/64; H04B 1/088; H04B 1/20; H04B 1/3805
USPC ...... 455/42, 557, 556.1, 562.1, 575.5, 575.7
See application file for complete search history.

(56) References Cited

U.S. PATENT DOCUMENTS

2008/0051155 A1* 2/2008 Lee .................. H04B 1/088
455/569.1
2013/0271340 A1* 10/2013 Zhang .................. H01Q 7/00
343/858

* cited by examiner

*Primary Examiner* — Ping Hsieh
(74) *Attorney, Agent, or Firm* — ScienBiziP, P.C.

(57) ABSTRACT

An electronic device with a Frequency Modulation (FM) antenna includes an earphone jack, an FM chip, a switching unit, and a processing unit. The earphone jack includes a left channel pin, a right channel pin, and a ground pin. The FM chip receives an FM signal and outputs a Receive Signal Strength Indicator (RSSI) value of the FM signal to the processing unit. The processing unit receives the RSSI value, compares the RSSI value with a predetermined value, and controls the switching unit to select the left and right channel pins as a signal receiving point of the FM antenna or select the ground pin as the signal receiving point of the FM antenna according to a result of the comparison.

12 Claims, 5 Drawing Sheets

ELECTRONIC DEVICE HAVING FM ANTENNA AND METHOD FOR SWITCHING FM ANTENNA

CROSS-REFERENCE TO RELATED APPLICATIONS

This application claims priority to Chinese Patent Application No. 201610435432.4 filed on Jun. 15, 2016, the contents of which are incorporated by reference herein.

FIELD

The subject matter herein generally relates to an electronic device having a Frequency Modulation (FM) antenna and a method for switching the FM antenna.

BACKGROUND

Many electronic devices, for example, mobile phones or personal digital assistants (PDAs), normally include an FM function. To simplify a structure of an electronic device, earphone pins of the electronic device generally serves as an FM antenna, for example, a grounding line of the earphone forms the FM antenna or left and right channel lines of the earphone cooperatively form the FM antenna.

When a grounding pin of an earphone jack serves as a signal receiving point of the FM antenna, the grounding pin generally includes an inductor for isolating the FM signal and a reference grounding point of an audio signal. The inductor has an impedance, which will lead to a sharply deteriorating of audio distortion. When a left channel pin and a right channel pin of the earphone jack cooperatively serve as the signal receiving point of the FM antenna, once the earphone is received in the earphone jack, the left and right channel lines of the earphone maybe surrounded by the ground, which will effect a receiving of the FM antenna.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
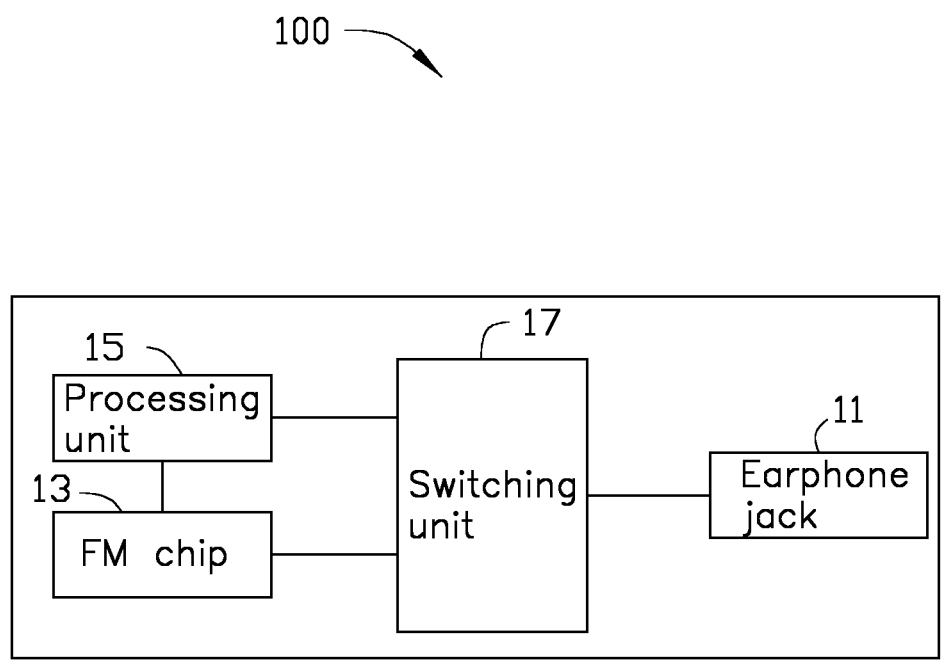
FIG. 1 is a block diagram of an electronic device according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an electronic device 100 having a Frequency Modulation (FM) function. The electronic device 100 can be a mobile phone, a tablet computer, or a personal digital assistant (PDA). The electronic device 100 includes an earphone jack 11, an FM chip 13, a processing unit 15, and a switching unit 17.

Figure 2:
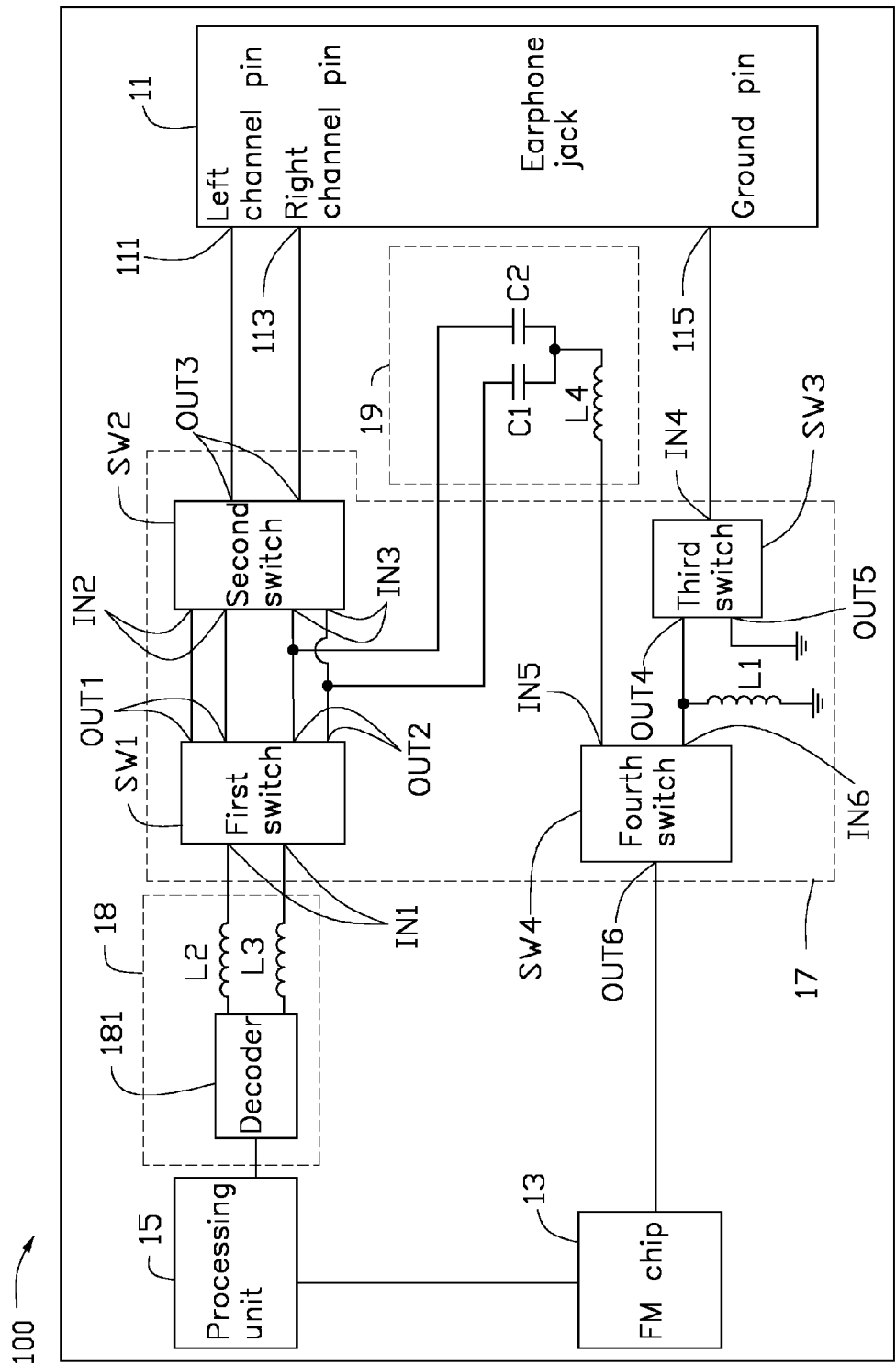
FIG. 2 is a circuit diagram of the electronic device of FIG. 1.

As illustrated in FIG. 2, the earphone jack 11 is configured to receive an earphone. The earphone jack 11 includes a left channel pin 111, a right channel pin 113, and a ground pin 115.

The FM chip 13 can be an integrated FM audio receiving circuit. The FM chip 13 is electrically connected to the left channel pin 111, the right channel pin 113, and the ground pin 115 through the switching unit 17. When an earphone is received in the earphone jack 11, the FM chip 13 can be switched to the left channel pin 111 and the right channel pin 113 through the switching unit 17. Then, the left channel pin 111 and the right channel pin 113 of the earphone jack 11 can serve as a signal receiving point of an FM antenna. In other exemplary embodiments, the FM chip 13 can also be switched to the ground pin 115 through the switching unit 17. Then, the ground pin 115 of the earphone jack 11 can serve as the signal receiving point of the FM antenna.

The FM chip 13 is electrically connected to the processing unit 15. The FM chip 13 is configured to receive an FM signal from the FM antenna and converts the FM signal to an audio signal. In other exemplary embodiments, the FM chip 13 is further configured to feedback a Receive Signal Strength Indicator (RSSI) value of the FM signal to the processing unit 15.

The processing unit 15 can be a Central Processing Unit (CPU). The processing unit 15 is electrically connected to the FM chip 13 and the switching unit 17. The processing unit 15 is configured to receive the audio signal from the FM chip 13 and send the audio signal to the left channel pin 111 and the right channel pin 113 through the switching unit 17.

In this exemplary embodiment, the switching unit 17 includes a first switch SW1, a second switch SW2, a third switch SW3, and a fourth switch SW4. The first switch SW1 includes a group of input terminals IN1, a first group of output terminals OUT1, and a second group of output terminals OUT2. The group of input terminals IN1 of the first switch SW1 are electrically connected to the processing unit 15. The group of input terminals IN1 of the first switch SW1 are configured to receive the audio signal from the processing unit 15 and output the audio signal to the second switch SW2 through one group of output terminals, for example, the first group of output terminals OUT1 or the second group of output terminals OUT2.

The second switch SW2 includes a first group of input terminals IN2, a second group of input terminals IN3, and a group of output terminals OUT3. The first and second groups of input terminals IN2, IN3 are respectively connected to one group of output terminals of the first switch SW1. For example, the first group of input terminals IN2 of the second switch SW2 is electrically connected to the first group of output terminals OUT1 of the first switch SW1. The second group of input terminals IN3 of the second switch SW2 is electrically connected to the second group of output terminals OUT2 of the first switch SW1. The output terminals OUT3 of the second switch SW2 are respectively connected to the left channel pin 111 and the right channel pin 113 of the earphone jack 11.

The third switch SW3 includes an input terminal IN4, a first output terminal OUT4, and a second output terminal OUT5. The input terminal IN4 of the third switch SW3 is electrically connected to the ground pin 115 of the earphone jack 11. The first output terminal OUT4 of the third switch SW3 is grounded through a first inductor L1 and is further electrically connected to the fourth switch SW4. The second output terminal OUT5 of the third switch SW3 is directly grounded.

The fourth switch SW4 includes a first input terminal IN5, a second input terminal IN6, and an output terminal OUT6. The first input terminal IN5 of the fourth switch SW4 is electrically connected to the second group of output terminals OUT2 of the first switch SW1 and the second group input terminals IN3 of the second switch SW2. The second input terminal IN6 of the fourth switch SW4 is electrically connected to the first output terminal OUT4 of the third switch SW3. The output terminal OUT6 of the fourth switch SW4 is electrically connected to the FM chip 13.

In this exemplary embodiment, the processing unit 15 further includes a detecting module (not shown). The detecting module is configured to receive the RSSI value from the FM chip 13, compare the RSSI value with a predetermined value, control the switching unit 17 to switch according to a comparison, and select the left and right channel pins 111, 113 or the ground pin 115 as the signal receiving point of the FM antenna. For example, when the processing unit 15 determines that the RSSI value from the FM chip 13 is greater than the predetermined value, the processing unit 15 controls the switching unit 17 to switch to the left and right channel pins 111, 113. Then, the left channel pin 111 and the right channel pin 113 of the earphone jack 11 are switched to the FM chip 13 and serve as the signal receiving point of the FM antenna to receive the FM signal. When the processing unit 15 determines that the RSSI value from the FM chip 13 is less than the predetermined value (that is, the RSSI value is less than or equal to the predetermined value), the processing unit 15 controls the switching unit 17 to switch to the ground pin 115. Then, the ground pin 115 of the earphone jack 11 is switched to the FM chip 13 and is selected as the signal receiving point of the FM antenna to receive the FM signal.

Figure 3:
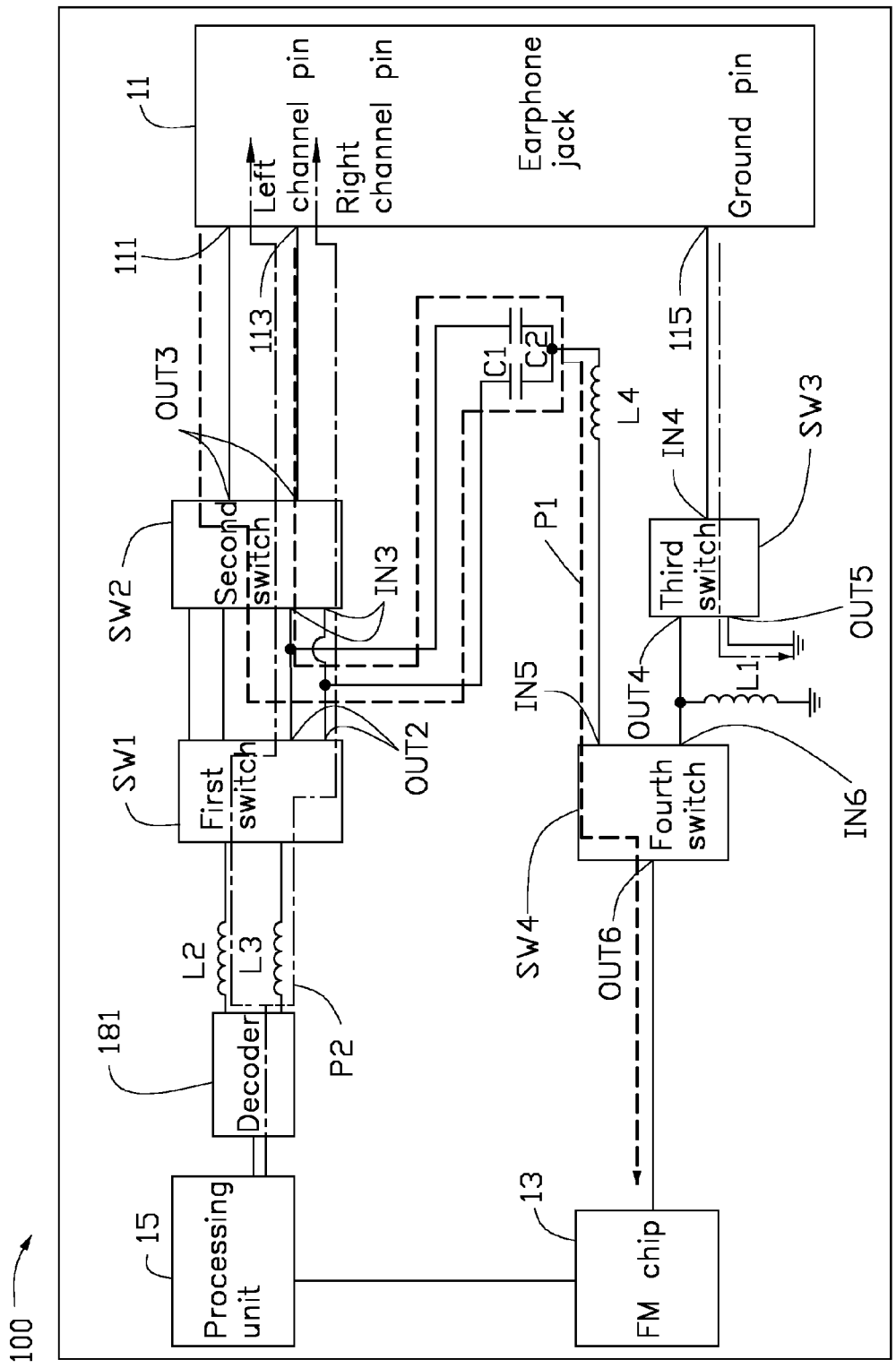
FIG. 3 is a transmitting path distribution graph of an FM signal of FIG. 2 when a RSSI value of the FM signal is greater than a predetermined value.

As illustrated in FIG. 3, in this exemplary embodiment, when the RSSI value from the FM chip 13 is greater than the predetermined value, the processing unit 15 controls the switching unit 17 to switch to a first mode. In the first mode, the first switch SW1 is switched to the second group of output terminals OUT2, the second switch SW2 is switched to the second group of input terminals IN3, the third switch SW3 is switched to the second output terminal OUT5, and the fourth switch SW4 is switched to the first input terminal IN5. Then, when an earphone is received in the earphone jack 11, the electronic device 100 receives the FM signal through the left channel pin 111 and the right channel pin 113 of the earphone jack 11. The FM signal is transmitted through the group of output terminals OUT3 and the second group of input terminals IN3 of the second switch SW2, then is transmitted to the first input terminal IN5 of the fourth switch SW4, and finally is transmitted to the FM chip 13 through the output terminal OUT6 of the fourth switch SW4 (please see a transmitting path P1).

The FM chip 13 converts the FM signal into an audio signal and sends the audio signal to the processing unit 15. The processing unit 15 receives the audio signal and outputs the audio signal to the group of input terminals IN1 of the first switch SW1. The audio signal further is transmitted to the left channel pin 111 and the right channel pin 113 of the earphone jack 11 through the second group of output terminals OUT2 of the first switch SW1, the second group of input terminals IN3 of the second switch SW2, and the group of output terminals OUT3 of the second switch SW2. The audio signal is also grounded through the ground pin 115 and the second output terminal OUT5 of the third switch SW3 (please see a transmitting path P2).

Figure 4:
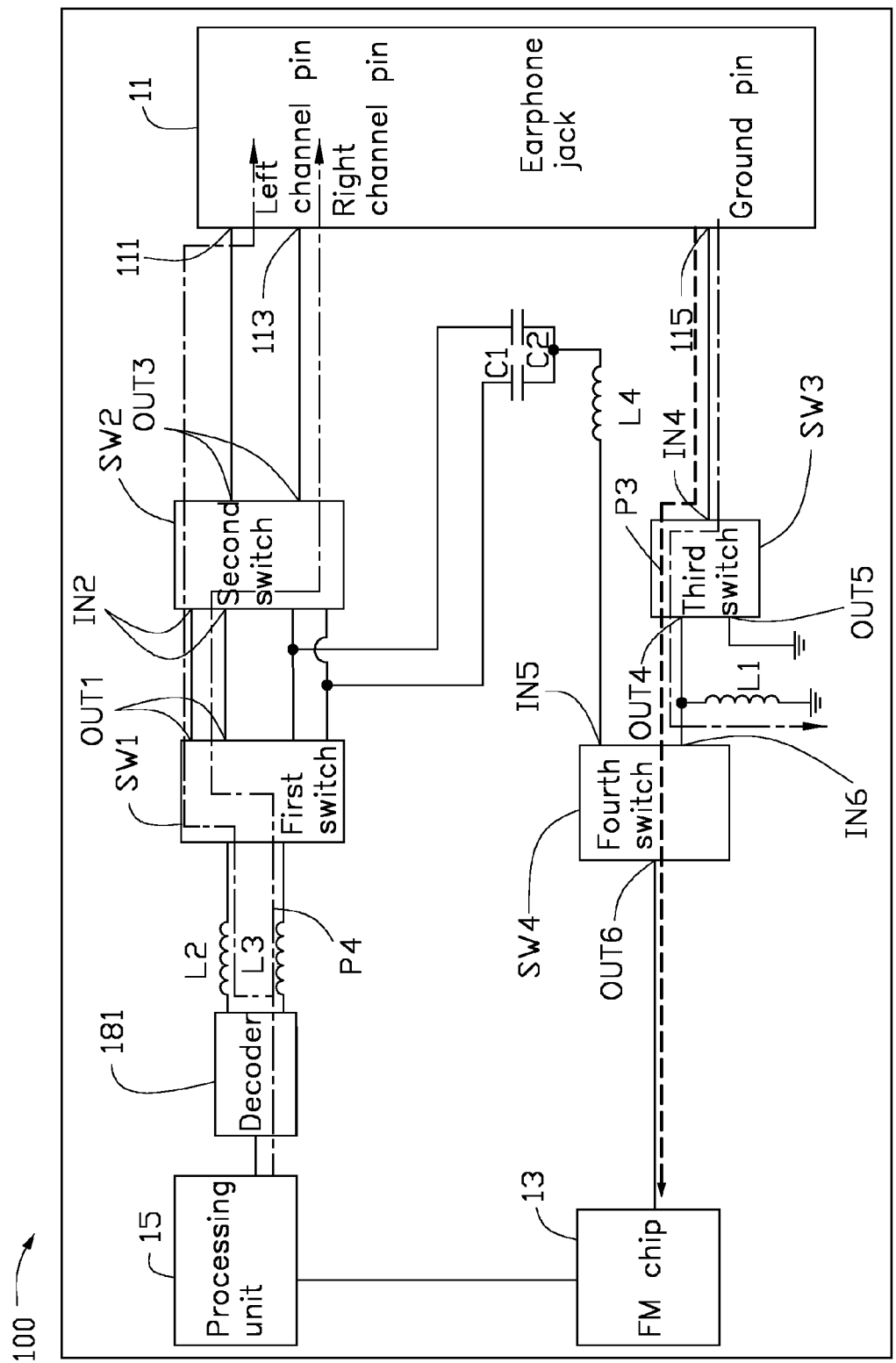
FIG. 4 is similar to FIG. 3 showing the RSSI value of the FM signal is less than a predetermined value.

As illustrated in FIG. 4, when the RSSI value from the FM chip 13 is less than the predetermined value, the processing unit 15 controls the switching unit 17 to switch to a second mode. In the second mode, the first switch SW1 is switched to the first group of output terminals OUT1, the second switch SW2 is switched to the first group of input terminals IN2, the third switch SW3 is switched to the first output terminal OUT4, and the fourth switch SW4 is switched to the second input terminal IN6. Then, when an earphone is received in the earphone jack 11, the electronic device 100 receives the FM signal through the ground pin 115 of the earphone jack 11. The FM signal is transmitted to the input terminal IN4 and the first output terminal OUT4 of the third switch SW3, then is transmitted to the second input terminal IN6 of the fourth switch SW4, and finally is transmitted to the FM chip 13 through the output terminal OUT6 of the fourth switch SW4 (please see a transmitting path P3).

The FM chip 13 converts the FM signal into an audio signal and sends the audio signal to the processing unit 15. The processing unit 15 receives the audio signal and outputs the audio signal to the input terminals IN1. The audio signal further is transmitted to the left channel pin 111 and the right channel pin 113 of the earphone jack 11 through the first group of output terminals OUT1 of the first switch SW1, the first group of input terminals IN2 of the second switch SW2, and the group of output terminals OUT3 of the second switch SW2. The audio signal is also grounded through the ground pin 115 of the earphone jack 11, the first output terminal OUT4 of the third switch SW3, and the first inductor L1 (please see a transmitting path P4).

As illustrated in FIG. 2, in other exemplary embodiments, the electronic device 100 further includes an audio unit 18. The audio unit 18 is electrically connected between the processing unit 15 and the group of input terminals IN1 of the first switch SW1. The audio unit 18 is configured to receive the audio signal from the processing unit 15 and decodes the audio signal. The audio unit 18 is further configured to prevent the FM signal from back flowing to the audio unit 18 through the first switch SW1, that is, the audio unit 18 is configured to prevent the FM signal from interfering with the audio signal.

In this exemplary embodiment, the audio unit 18 includes a decoder 181, a second inductor L2, and a third inductor L3. The decoder 181 is electrically connected to the processing unit 15. The second inductor L2 and the third inductor L3 are connected in parallel. The second and third inductors L2, L3 connected in parallel are electrically connected between the decoder 181 and the group of input terminals IN1 of the first switch SW1. The decoder 181 is configured to receive the audio signal from the processing unit 15 and decode the audio signal to filter noise of the audio signal. The second and third inductors L2, L3 are configured to prevent the FM signal from back flowing to the decoder 181 through the first switch SW1, that is, to prevent the FM signal from interfering with the audio signal.

As illustrated in FIG. 2, the electronic device 100 further includes a matching circuit 19. One end of the matching circuit 19 is electrically connected to the second group of output terminals OUT2 of the first switch SW1 and the second group of input terminals IN3 of the second switch SW2. Another end of the matching circuit 19 is electrically connected to the first input terminal IN5 of the fourth switch SW4. The matching circuit 19 is configured to filter out noises or unnecessary frequencies outside the FM frequency band. The matching circuit 19 is further configured for impedance matching for the FM signal for improving a receiving effectiveness of the FM signal.

In this exemplary embodiment, the matching circuit 19 includes a first capacitor C1, a second capacitor C2, and a fourth inductor L4. The first capacitor C1 and the second capacitor C2 are connected in parallel. The first and second capacitors C1, C2 connected in parallel are electrically connected to the second group of output terminals OUT2 of the first switch SW1 and the second group of input terminals IN3 of the second switch SW2. The first and second capacitors C1, C2 are further electrically connected in series to the fourth inductor L4 and thus are electrically connected to the first input terminal IN5 of the fourth switch SW4 through the fourth inductor L4.

Figure 5:
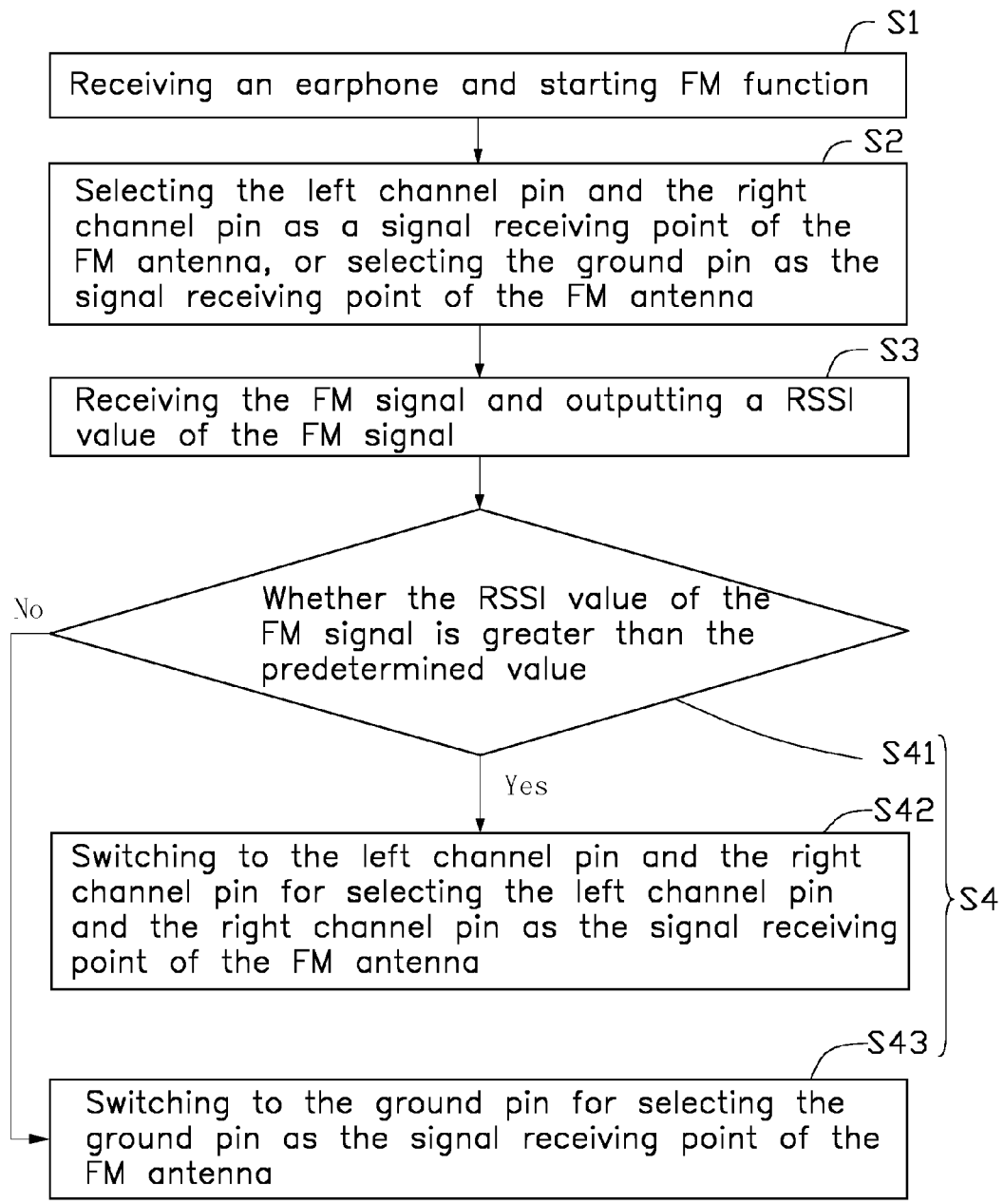
FIG. 5 is a flowchart of a method for switching an FM antenna.

FIG. 5 illustrates a flowchart of a method for switching FM antenna. The method is provided by way of example, as there are a variety of ways to carry out the method. Each block shown in FIG. 5 represents one or more processes, methods, or subroutines which are carried out in the example method. Furthermore, the order of blocks is illustrative only and additional blocks can be added or fewer blocks may be utilized without departing from the scope of this disclosure.

At block S1, an earphone is received in the earphone jack 11 and an FM function of the electronic device 100 is started.

At block S2, the processing unit 15 controls the switching unit 17 to switch and select the left channel pin 111 and the right channel pin 113 as a signal receiving point of the FM antenna, or select the ground pin 115 as the signal receiving point of the FM antenna.

In this exemplary embodiment, in an initial state, the left channel pin 111 and the right channel pin 113 of the earphone jack 11 serves as the signal receiving point of the FM antenna. In the initial state, the ground pin 115 of the earphone jack 11 can also be selected as the signal receiving point of the FM antenna.

At block S3, the FM chip 13 receives the FM signal and outputs a RSSI value of the FM signal.

At block S4, the processing unit 15 compares the RSSI value of the FM signal with a predetermined value, and controls the switching unit 17 to switch to the left channel pin 111 and the right channel pin 113, or the ground pin 115 according to the comparison result.

In this exemplary embodiment, block S4 further includes blocks S41-S43.

At block S41, the processing unit 15 determines whether the RSSI value of the FM signal is greater than the predetermined value. When the RSSI value of the FM signal is greater than the predetermined value, block S42 is executed. When the RSSI value of the FM signal is less than the predetermined value, that is, the RSSI value of the FM signal is less than or equal to the predetermined value, block S43 is executed.

At block S42, when the processing unit 15 determines that the RSSI value of the FM signal is greater than the predetermined value, a quality of the FM signal received by the FM chip 13 is indicated as good. Then the switching unit 17 switches to the left channel pin 111 and the right channel pin 113, that is, the left channel pin 111 and the right channel pin 113 are selected as the signal receiving point of the FM antenna.

In addition, the audio signal is grounded through the ground pin 115 and the second output terminal OUT5 of the third switch SW3, which will effectively improve distortion of the audio signal. It is tested that a distortion level of the audio signal is about −88 dB, which can satisfy a distortion need of WIFI audio signal, that is, less than −85 dB.

At block S43, when the processing unit 15 determines that the RSSI value of the FM signal is less than the predetermined value, a quality of the FM signal received by the FM chip 13 is indicated as bad. Then the switching unit 17 switches to the ground pin 115, that is, the ground pin 115 is selected as the signal receiving point of the FM antenna for enhancing a receiving signal of the FM signal.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device with a Frequency Modulation (FM) antenna, the electron device comprising:
   an earphone jack, the earphone jack comprising a left channel pin, a right channel pin, and a ground pin;
   an FM chip;
   a switching unit electrically connected to the FM chip; and
   a processing unit electrically connected to the left channel pin, the right channel pin, and the ground pin through the switching unit;
   wherein the FM chip is electrically connected to the processing unit, the FM chip receives an FM signal and feedbacks a Receive Signal Strength Indicator (RSSI) value of the FM signal to the processing unit; the processing unit receives the RSSI value, compares the RSSI value with a predetermined value, and controls the switching unit to select the left and right channel pins as a signal receiving point of the FM antenna or select the ground pin as the signal receiving point of the FM antenna according to a result of the comparison.

2. The electronic device of claim 1, wherein the switching unit comprises a first switch, a second switch, a third switch, and a fourth switch, the first switch comprises a group of input terminals, a first group of output terminals, and a second group of output terminals; the second switch comprises a first group of input terminals, a second group of input terminals, and a group of output terminals; the third switch comprises an input terminal, a first output terminal, and a second output terminal; the fourth switch comprises a first input terminal, a second input terminal, and an output terminal; the group of input terminals of the first switch are electrically connected to the processing unit; the first group of input terminals of the second switch is electrically connected to the first group of output terminals of the first switch, the second group of input terminals of the second switch is electrically connected to the second group of output terminals of the first switch, and the output terminals of the second switch are respectively connected to the left channel pin and the right channel pin; the input terminal of the third switch is electrically connected to the ground pin, the first output terminal of the third switch is grounded through a first inductor, and the second output terminal of the third switch is directly grounded; the first input terminal of the fourth switch is electrically connected to the second group of output terminals of the first switch and the second group input terminals of the second switch, the second input terminal of the fourth switch is electrically connected to the first output terminal of the third switch, and the output terminal of the fourth switch is electrically connected to the FM chip.

3. The electronic device of claim 2, wherein when the RSSI value from the FM chip is greater than the predetermined value, the processing unit controls the switching unit to switch to a first mode; wherein in the first mode, the first switch is switched to the second group of output terminals, the second switch is switched to the second group of input terminals, the third switch is switched to the second output terminal, and the fourth switch is switched to the first input terminal, the left channel pin and the right channel pin are selected as the signal receiving point of the FM antenna.

4. The electronic device of claim 3, wherein in the first mode, the electronic device receives the FM signal through the left channel pin and the right channel pin, the FM signal is transmitted through the group of output terminals of the second switch and the second group of input terminals of the second switch, then is transmitted to the first input terminal of the fourth switch, and finally is transmitted to the FM chip through the output terminal of the fourth switch, the FM chip converts the FM signal into an audio signal and sends the audio signal to the processing unit, the audio signal is transmitted to the left channel pin and right channel pin through the second group of output terminals of the first switch, the second group of input terminals of the second switch, and the output terminals of the second switch, and is grounded through the ground pin and the second output terminal of the third switch.

5. The electronic device of claim 2, wherein when the RSSI value from the FM chip is less than the predetermined value, the processing unit controls the switching unit to switch to a second mode; wherein in the second mode, the first switch is switched to the first group of output terminals, the second switch is switched to the first group of input terminals, the third switch is switched to the first output terminal, and the fourth switch is switched to the second input terminal, the ground pin is selected as the signal receiving point of the FM antenna.

6. The electronic device of claim 5, wherein in the second mode, the electronic device receives the FM signal through the ground pin, the FM signal is transmitted to the second input terminal of the fourth switch through the first output terminal of the third switch, then is transmitted to the FM chip through the output terminal of the fourth switch, the FM chip converts the FM signal into an audio signal and sends the audio signal to the processing unit, the audio signal is transmitted to the left channel pin and right channel pin through the first group of output terminals of the first switch, the first group of input terminals of the second switch, and the output terminals of the second switch, and is grounded through the ground pin, the first output terminal of the third switch, and the first inductor.

7. The electronic device of claim 2, further comprising an audio unit, wherein the audio unit is electrically connected between the processing unit and the group of input terminals of the first switch, the audio unit receives the audio signal from the processing unit and decodes the audio signal; the audio unit is further configured to prevent the FM signal from back flowing to the audio unit through the first switch.

8. The electronic device of claim 7, wherein the audio unit comprises a decoder, a second inductor, and a third inductor, the decoder is electrically connected to the processing unit, the second inductor and the third inductor are connected in parallel, and the second and third inductors are electrically connected between the decoder and the group of input terminals of the first switch.

9. The electronic device of claim 2, further comprising a matching circuit, wherein one end of the matching circuit is electrically connected to the second group of output terminals of the first switch and the second group of input terminals of the second switch, another end of the matching circuit is electrically connected to the first input terminal of the fourth switch; the matching circuit is configured to filter out noises or unnecessary frequencies outside an FM frequency band, and the matching circuit is further configured for impedance matching for the FM signal.

10. The electronic device of claim 9, wherein the matching circuit comprises a first capacitor, a second capacitor, and a fourth inductor, the first capacitor and the second capacitor are connected in parallel, the first and second capacitors are electrically connected to the second group of output terminals of the first switch and the second group of input terminals of the second switch, the first and second capacitors are further electrically connected in series to the fourth inductor and are electrically connected to the first input terminal of the fourth switch through the fourth inductor.

11. A method for switching an FM antenna applied to an electronic device, the electronic device comprising an earphone jack, the earphone jack comprising a left channel pin, a right channel pin, and a ground pin, the method comprising:
(a) receiving an earphone in the earphone jack;
(b) selecting the left and right channel pins as a signal receiving point of the FM antenna or select the ground pin as the signal receiving point of the FM antenna;
(c) receiving an FM signal and outputting a Receive Signal Strength Indicator (RSSI) value of the FM signal; and
(d) comparing the RSSI value with a predetermined value and switching the signal receiving point of the FM antenna to the left and right channel pins or switching the signal receiving point of the FM antenna to the ground pin according to a result of the comparison.

12. The method of claim 11, wherein step (d) further comprising:
determining whether the RSSI value of the FM signal is greater than the predetermined value;
switching to the left channel pin and the right channel pin and selecting the left channel pin and the right channel pin as the signal receiving point of the FM antenna when the RSSI value of the FM signal is greater than the predetermined value; and switching to the ground pin for selecting the ground pin as the signal receiving point of the FM antenna when the RSSI value of the FM signal is less than the predetermined value.

* * * * *